(12) United States Patent
Ma et al.

(10) Patent No.: US 7,249,135 B2
(45) Date of Patent: Jul. 24, 2007

(54) METHOD AND SYSTEM FOR SCHEMA MATCHING OF WEB DATABASES

(75) Inventors: Wei-Ying Ma, Beijing (CN); Ji-Rong Wen, Beijing (CN)

(73) Assignee: Microsoft Corporation, Redmond, WA (US)

( * ) Notice: Subject to any disclaimer, the term of this patent is extended or adjusted under 35 U.S.C. 154(b) by 488 days.

(21) Appl. No.: 10/846,396

(22) Filed: May 14, 2004

(65) Prior Publication Data

US 2005/0256850 A1    Nov. 17, 2005

(51) Int. Cl.
G06F 17/30      (2006.01)
(52) U.S. Cl. .......................... 707/100; 707/102; 707/3
(58) Field of Classification Search ................ 707/100, 707/102, 3
See application file for complete search history.

(56) References Cited

OTHER PUBLICATIONS

Wang et al., "Data Extraction and Label Assignment for Web Databases", WWW 2003, May 20-24, 2003, Budapest, Hungary, pp. 187-196.*
Berlin et al., "Database Schema Matching Using Machine Learning with Feature Selection", CAISE 2002, LNCS 2348, Springer-Verlag, pp. 452-466. (Provided by Applicant).*
Hai He et al., "WISE-Integrator: An Automatic Integrator of Web Search Interfaces for E-Commerce", Proceedings of the 29th VLDB Conference, Berlin, Germany, 2003, 12 pages. (Provided by Applicant).*
Kang et al., "On Schema Matching with Opaque Column Names and Data Values", SIGMOD 2003, Jun. 9-12, 2003, San Diego, CA, ACM, 12 pages. (Provided by Applicant).*

Cohen, William W., "Integration of Heterogeneous Databases Without Common Domains Using Queries Based on Textual Similarity," SIGMOD '98, Seattle, Washington (12 pages).
Nie, Zaiqing, et al., "Mining Coverage Statistics for Websource Selection in a Mediator," Conference on Information and Knowledge Management, Proceedings of the Eleventh International Conference on Information and Knowledge Management, 2002 (35 pages).
Ipeirotis, Panagiotis, G. et al., "Extending SDARTS: Extracting Metadata from Web Databases and Interfacing with the Open Archives Initiative," JCDL '02, Jul. 13-17, 2002, Portland, Oregon (9 pages).
Wang, Jiying, "Data Extraction and Label Assignment for Web Databases," May 20-24, 2003, Budapest, Hungary (17 pages). http://www2003.org/cdrom/papers/refereed/p470/p470-wang.htm.
Raghavan, Sriram and Garcia-Molina, Hector, "Crawling the Hidden Web," Proceedings of the 27th VLDB Conference, Rome, Italy, 2001 (10 pages).

(Continued)

Primary Examiner—Charles Rones
Assistant Examiner—Phuong-Thao Cao
(74) Attorney, Agent, or Firm—Perkins Coie LLP

(57) ABSTRACT

A method and system for identifying schemas of web databases is provided. A schema matching system generates a mapping between an interface schema and a result schema of a web database, which is used to represent the underlying database schema. The schema matching system also generates a mapping of the interface attributes and the result attributes of the web database to global attributes of a global schema whose semantics are known. Using these mappings, a search engine service can formulate queries using the global attributes, map those queries to the corresponding interface attributes, submit the query, and retrieve the values from the result attributes that correspond to the desired global attributes.

15 Claims, 13 Drawing Sheets

OTHER PUBLICATIONS

He, Bin and Chang, Kevin Chen-Chuan, "Statistical Schema Matching Across Web Query Interfaces," SIGMOD 2003, Jun. 9-12, 2003, San Diego, California, Copyright 2003 ACM (12 pages).

Weiyi Meng, Hai He et al., "WISE-Integrator: An Automatic Integrator of Web Search Interfaces for E-Commerce," Proceedings of the 29th VLDB Conference, Berlin, Germany, 2003 (12 pages).

European Search Report, Application No. EP 05103966, May 29, 2006, 4 pages.

Berlin, Jacob and Amihai Motro, "Database Schema Matching Using Machine Learning with Feature Selection," CAISE 2002, LNCS 2348, © 2002 Springer-Verlag, pp. 452-466.

Wang, Jiying et al., "Instance-based Schema Matching for Web Databases by Domain-specific Query Probing," Proceedings of the 30th VLDB Conference, Toronto, Canada, 2004, pp. 408-419.

Kang, Jaewoo and Jeffrey F. Naughton, "On Schema Matching with Opaque Column Names and Data Values," SIGMOD Jun. 9-12, 2003, San Diego, © 2003 ACM, 12 pages.

Arasu, Arvind and Hector Garcia-Molina, "Extracting Structured Data from Web Pages," SIGMOD Jun. 9-12, 2003, San Diego, CA, © 2003 ACM, pp. 337-348.

Gal, Avigdor et al., "Automatic Ontology Matching using Application Semantics," AI Magazine, American Association of Artificial Intelligence, La Canada, CA, 2003, pp. 1-16.

He, Bin and Kevin Chen-Chuan Chang, "Automatic Complex Schema Matching across Web Query Interfaces: A Correlation Mining Approach," ACM Transactions on Database Systems, vol. 31, No. 1, Mar. 2006, pp. 1-45.

* cited by examiner

US 7,249,135 B2

METHOD AND SYSTEM FOR SCHEMA MATCHING OF WEB DATABASES

TECHNICAL FIELD

The described technology relates generally to determining the schema of a web database.

BACKGROUND

The World Wide Web ("web") provides vast amounts of information that is accessible via web pages. Web pages can contain either static content or dynamic content. Static content refers generally to information that may stay the same across many accesses of the web pages. Dynamic content refers generally to information that is stored in a web database and is added to a web page in response to a search request. Dynamic content represents what has been referred to as the deep web or hidden web.

Many search engine services allow users to search for static content of the web. After a user submits a search request or query that includes search terms, the search engine service identifies web pages that may be related to those search terms. These web pages are the search result. To quickly identify related web pages, the search engine services may maintain a mapping of keywords to web pages. This mapping may be generated by "crawling" the web to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on.

These search engine services, however, do not in general provide for searching of dynamic content, which is also considered noncrawlable content. One problem with searching dynamic content is that it is difficult or impossible to directly obtain the schemas of the corresponding web databases without the cooperation of the web site that provides the web database. A schema defines the information or attributes that are stored in the database. For example, a web database for a seller of books may have a schema for its catalog of books (i.e., a web database) that includes a title attribute and an author attribute for each book. Without knowing the schema, it would be very difficult for a search engine service to crawl the content of a web database to determine what information is available for searching. Even if the schema of a web database were known, a search engine service would still need to determine how to crawl the web database to retrieve its content. Assuming that a search engine could retrieve the content of web databases, the search engine service would still need to identify when attributes of different schemas represent semantically equivalent attributes. For example, bookseller web sites may have catalogs that specify whether the book is paperback, hardcover, or compact disc. One bookseller's web site may name this attribute "type," and another bookseller's web site may name the same attribute "format." To allow effective searching of dynamic content across multiple web sites, a search engine service needs to know the meaning or semantics of the attributes of the web databases.

It would be desirable to have a technique that would automatically identify schemas associated with web databases and to identify attributes of different schemas that represent the same semantic content.

SUMMARY

A method and system for identifying schemas of web databases is provided. A schema matching system generates a mapping between an interface schema and a result schema of a web database, which is used to represent the underlying database schema. The schema matching system also generates a mapping of the interface attributes and the result attributes of the web database to global attributes of a global schema whose semantics are known. Using these mappings, a search engine service can formulate queries using the global attributes, map those queries to the corresponding interface attributes, submit the query, and retrieve the values from the result attributes that correspond to the desired global attributes.

DETAILED DESCRIPTION

A method and system for identifying schemas of web databases is provided. In one embodiment, a schema matching system generates a mapping between an interface schema and a result schema of a web database, which is used to represent the underlying database schema. The interface schema of a web database represents the attributes of the database that can be used for searching. The result schema of a web database represents the attributes of the database that are displayed as part of the search result. The mapping indicates which interface attribute has the same meaning (also referred to as corresponds to or matches) as which result attribute. The schema matching system also generates a mapping of the interface attributes and the result attributes of the web database to global attributes of a global schema whose semantics are known. Using these mappings, a search engine service can formulate queries using the global attributes, map those queries to the corresponding interface attributes, submit the query, and retrieve the values from the result attributes that correspond to the desired global attributes. In this way, the schema matching system identifies schemas of a web database that can be used for searching the web database.

Figure 1:
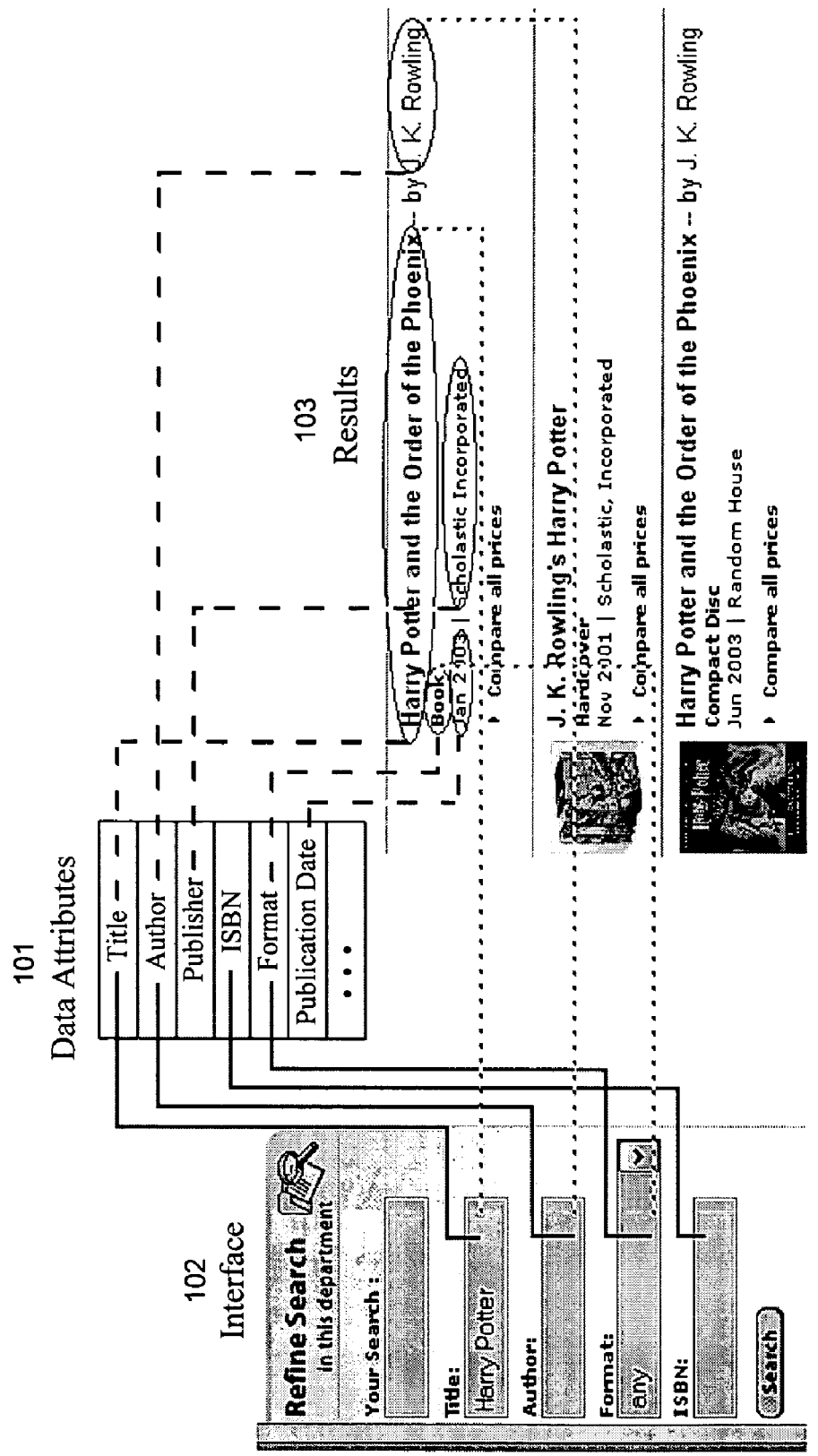
FIG. 1 is a diagram that illustrates various schemas of a web database for a bookseller.

FIG. 1 is a diagram that illustrates various schemas of a web database for a bookseller. The web database includes a database schema 101, an interface schema 102, and a result schema 103. The database schema represents the underlying schema of the web database, which in this example includes the attributes title, author, publisher, ISBN, format, and publication date. The web site provides a search web page so a user can visit to search for books. The interface schema for this web database includes the attributes title, author, format, and ISBN. A user can specify search strings for any combination of interface attributes for searching the book database. The "your search" field of the web page allows a user to search within all attributes of the web database. The result of the search is displayed on a result web page. The result schema for this web database includes title, author, publisher, format, and publication date. The result of a search will typically provide multiple entries for each entry of the database that matches the search request. Each entry of a result typically contains a value for each of the result attributes. In this example, the interface schema has an attribute (i.e., ISBN) that is not included in the result schema, and the result schema has an attribute (i.e., publication date) that is not included in the interface schema.

In addition to using an interface schema and a result schema for a web database, the schema matching system also uses a domain-specific global schema. A global schema for a domain represents the set of attributes that are generally used by web databases within that domain. For example, web databases within the domain of books typically have attributes that include title, author, and publisher, and web databases within the domain of automobiles typically have attributes that include make, model, and year. A global schema may also have sample global attribute values associated with it. For example, the publisher attribute of a book domain may have global attribute values that include "Random House" and "MIT Press."

To generate the mappings, the schema matching system initially identifies the global schema for the domain of the web database and the interface schema and result schema of the web database. (Techniques for identifying these schemas are described below.) The schema matching system generates queries from global attribute values (e.g., from a sample set of values) of the global attributes and submits those queries via the interface web page to the web database (e.g., sending an HTTP request that corresponds to the submitting of a query via the search web page). The schema matching system analyzes the result presented by the result web page to determine which interface attributes correspond to which result attributes ("interface-to-result correspondence"), which global attributes correspond to which interface attributes ("global-to-interface correspondence"), and which global attributes correspond to which result attributes ("global-to-result" correspondence). These correspondences are referred to as "intra-site" matching since the interface and result schemas correspond to the schemas of a single web site. The schema matching system identifies that an interface attribute may correspond to a result attribute based on when a value of the result attribute matches the value of the interface attribute used when searching. For example, when the title interface attribute is given the value of "Harry Potter," many entries of the result will likely have the value of "Harry Potter" in the title result attribute. In contrast, when the author interface attribute is given the value of "Harry Potter" for a search, only a few entries of the result will likely have the value of "Harry Potter" in the title interface attribute. As such, the title interface attribute likely corresponds to the title result attribute, but the author interface attribute likely does not correspond to the title result attribute.

In one embodiment, the schema matching system may also generate mappings between interface schemas and result schemas of different web sites. The schema matching system analyzes the results of the queries submitted as described above and identifies which interface attribute of one web site's schema corresponds to which interface attribute of another web site's schema ("interface-to-interface correspondence") and which result attribute of one web site's schema corresponds to which result attribute of another web site's schema ("result-to-result correspondence"). For example, the schema matching system may identify that the type interface attribute of one web site may correspond to the format interface attribute of another web site. These correspondences are referred to as "inter-site" matching since schemas are matched between different web sites. The inter-site matching information may be used when searching multiple web databases within a domain. The inter-site matching information may also be used to help validate whether intra-site matching is correct.

Figure 2:
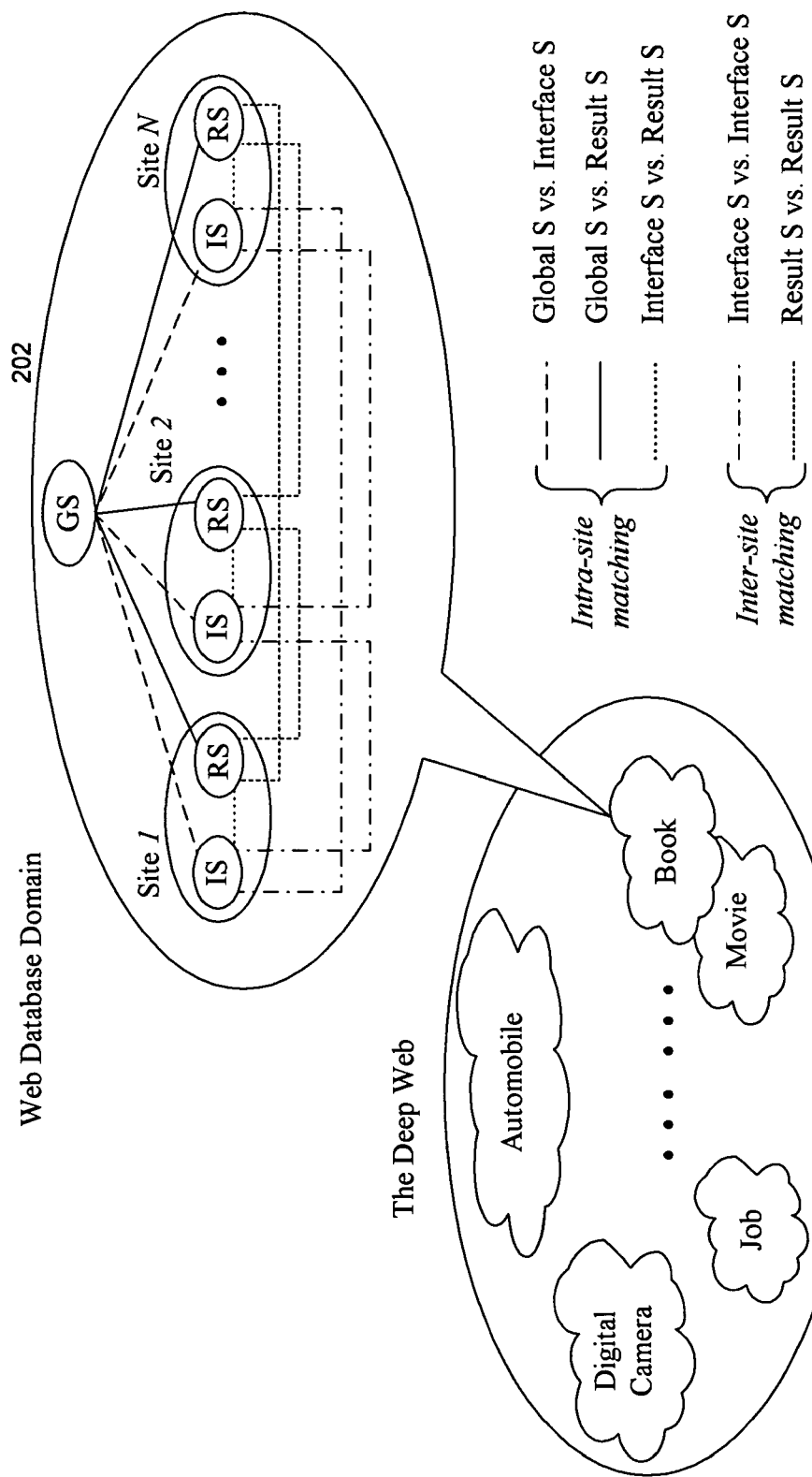
FIG. 2 illustrates intra-site and inter-site matching in one embodiment.

FIG. 2 illustrates intra-site and inter-site matching in one embodiment. Oval 202 represents the schemas relating to web databases within a book domain. Each site 1 . . . N has an interface schema ("IS") and a result schema ("RS"), and the domain has a global schema ("GS"). The lines between the representations of the schemas represent the intra-site and inter-site matching. For example, the line between IS of site 1 and GS represents the intra-site global-to-interface correspondence, the line between IS of site 1 and RS of site 1 represents the intra-site interface-to-result correspondence, and the line between IS of site 1 and IS of site 2 represents the inter-site interface-to-interface correspondence between site 1 and site 2.

In one embodiment, the schema matching system generates an occurrence cube that identifies, for each combination of global attribute, interface attribute, and result attribute of a web database, the number of times that a global attribute value for that global attribute occurs in that result attribute when the global attribute value is used as the value of that interface attribute when searching. For each interface attribute, the schema matching system submits multiple queries. Each query has the value of that interface attribute set to a different global attribute value. For example, if the global attributes include a format attribute with values of paperback, hardback, and compact disc and an author attribute with a value of Rowling, then the schema matching system submits a query with the title attribute set to paperback, a query with the title attribute set to hardback, a query with the title attribute set to compact disc, and a query with the title attribute set to Rowling. For each other interface attribute, the schema matching system submits queries for the global attribute values of a paperback, hardback, compact disc, and Rowling. For each query result, the schema matching system counts the number of times that the global attribute value of the query occurs as a value in each result attribute. For example, when a query is submitted with the title interface attribute set to paperback, it is likely that very few or no matches will be found, which indicates that the title interface attribute probably does not match the format global attribute. In contrast, when a query is submitted with the format interface attribute set to paperback, it is likely that many matches will be found and the search term "paperback" will be found in many entries of the result within the format result attribute, which indicates that the format global attribute, format interface attribute, and format result attribute likely correspond to one another. A high count for a particular global attribute, interface attribute, and result attribute combination, especially relative to other combinations, may indicate that those attributes likely correspond, i.e., they represent the same semantic content.

After generating an occurrence cube, the schema matching system creates occurrence matrices for the global-to-interface correspondence, the global-to-result correspondence, and the interface-to-result correspondence. In one embodiment, the schema matching system creates an occurrence matrix by projecting a dimension of the occurrence cube onto a plane. To generate the occurrence matrix for the global-to-interface correspondence, the schema matching system sums the count of occurrences for all the result attributes for each global attribute and interface attribute combination. The schema matching system generates the occurrence matrices for the global-to-result correspondence and the interface-to-result correspondence in a similar matter. Table 1 is an example of an occurrence matrix for the global-to-interface correspondence.

TABLE 1

|  | $Title_{GS}$ | $Author_{GS}$ | $Publisher_{GS}$ | $ISBN_{GS}$ |
|---|---|---|---|---|
| $Author_{IS}$ | 93 | 498 | 534 | 0 |
| $Title_{IS}$ | 451 | 345 | 501 | 0 |
| $Publisher_{IS}$ | 62 | 184 | 468 | 2 |
| $Keyword_{IS}$ | 120 | 248 | 143 | 275 |
| $ISBN_{IS}$ | 0 | 0 | 0 | 258 |

Although the magnitude of a count is an indication of the correspondence between pairs of attributes, the relative magnitude is more indicative of a match than the absolute magnitude. In particular, a high occurrence count may not represent corresponding attributes. For example, the matrix element for $Author_{IS}$ and $Publisher_{GS}$ (534) is the highest value in the matrix, but $Author_{IS}$ and $Publisher_{GS}$ do not semantically correspond to each other. Generally, given a particular matrix element $m_{ij}$, its relative magnitude among all elements for its interface attribute i and global attribute j is more important than its absolute magnitude. For example, $Keyword_{IS}$, which may include the "your search" field and which is not a real attribute for the book domain, has a similar performance for all global attributes, which indicates that it may not be a good match for any one of the global attributes. The element of $Publisher_{IS}$ and $Publisher_{GS}$ (468) is not the highest one among the elements for $Publisher_{GS}$. However, it is relatively larger than the other elements for $Publisher_{IS}$.

To identify which pair of attributes corresponds, the schema matching system estimates a mutual information content of the pair of attributes. Mutual information is also referred to as cross-entropy and information gain. The schema matching system considers each schema to represent a partitioning of the web database by the schema's attributes. Pairs of attributes from different schemas whose partitions overlap the most are likely to correspond. In one embodiment, the schema matching system estimates mutual information between a pair of attributes according to the following equation:

$$EMI(S_{1i}, S_{2j}) = \frac{m_{ij}}{M} \log \frac{\frac{m_{ij}}{M}}{\frac{m_{i+}}{M} * \frac{m_{+j}}{M}} \quad (1)$$

where EMI is the estimated mutual information between the $i^{th}$ attribute of schema $S_{1i}$ and $j^{th}$ attribute of $S_{2j}$, M is $$\sum_{i,j} m_{ij}, m_{i+} \text{ is } \sum_{i} m_{ij}, \text{ and } m_{+j} \text{ is } \sum_{j} m_{ij}.$$

The EMI matrix for the occurrence matrix of Table 1 is shown in Table 2.

TABLE 2

|  | $Title_{GS}$ | $Author_{GS}$ | $Publisher_{GS}$ | $ISBN_{GS}$ |
|---|---|---|---|---|
| $Author_{IS}$ | −0.04 | 0.11 | 0.06 | 0.00 |
| $Title_{IS}$ | 0.19 | −0.03 | −0.01 | 0.00 |
| $Publisher_{IS}$ | −0.03 | −0.02 | 0.14 | −0.01 |
| $Keyword_{IS}$ | −0.01 | 0.01 | −0.07 | 0.17 |
| $ISBN_{IS}$ | 0.00 | 0.00 | 0.00 | 0.32 |

The schema matching system detects a match between attributes when one EMI matrix element is larger than the other elements for the same interface attribute (i.e., in the same row) and also larger than the other elements for the same global attribute (i.e., in the same column). The corresponding attributes have a larger overlap in information content between each other than their overlap with other attributes of the opposite schema as shown by the rectangles. For example, the EMI matrix element for $Author_{IS}$ and $Author_{GS}$ (i.e., 0.11) is the largest one for both the author interface attributes and the author global attributes, and it is a correct match. The match of attributes is represented by the following equation:

$$MAP(S_{1i}, S_{2j}) = \text{match when } e_{ij} \geq e_{ik} | k \neq j \text{ and } e_{ij} | e_{ik} - k \neq i \quad (2)$$

where MAP indicates whether the $i^{th}$ attribute of schema $S_1$ matches the $j^{-th}$ attribute of schema $S_2$ and $e_{ij}$ is the EMI matrix element for the $i^{th}$ attribute of schema $S_1$ and the $j^{th}$ attribute of schema $S_2$.

In one embodiment, the schema matching system identifies matches between attributes of different web databases. The schema matching system identifies matches based on the similarity between vectors of corresponding occurrence matrices for the web databases. For example, Table 3 represents the global-to-interface occurrence matrix for schema $S_1$ and Table 4 represents the global-to-interface occurrence matrix for schema $S_2$. The global schema GS is {Title, Author, Publisher, ISBN}, the interface schema $IS_1$ for site 1 is {$Author_1$, $Title_1$, $Publisher_1$, $Keyword_1$, $ISBN_1$}, and the interface schema $IS_2$ for site 2 is {$Title_2$, $Author_2$, $ISBN_2$}.

TABLE 3

|  | $T_G$ | $A_G$ | $P_G$ | $I_G$ |
|---|---|---|---|---|
| $A_1$ | 93 | 498 | 534 | 0 |
| $T_1$ | 451 | 345 | 501 | 0 |
| $P_1$ | 62 | 184 | 468 | 2 |
| $K_1$ | 120 | 248 | 143 | 275 |
| $I_1$ | 0 | 0 | 0 | 258 |

TABLE 4

|        | $T_G$ | $A_G$ | $P_G$ | $I_G$ |
|--------|-------|-------|-------|-------|
| $T_2$    | 166   | 177   | 118   | 0     |
| $A_2(P)$ | 39    | 331   | 406   | 0     |
| $I_2$    | 0     | 0     | 0     | 18    |

Attribute A1 is represented by the vector of the first row of Table 3, and attribute A2 is represented by the vector of the second row of Table 4. The schema matching system calculates the similarity between two attributes using the following equation:

$$EVS(S_{1i}, S_{2j}) = \frac{\sum_k a_{ik} b_{jk}}{\sqrt{\sum_k a_{ik}^2} * \sqrt{\sum_k b_{jk}^2}} \quad (3)$$

where EVS is the estimated vector similarity between the $i^{th}$ attribute of schema $S_1$ and the $j^{th}$ attribute of schema $S_2$, $a_{ik}$ represents the values of the occurrence matrix for schema $S_1$, and $b_{jk}$ represents the values of the occurrence matrix for schema $S_2$.

Table 5 represents the estimated vector similarities derived from Table 3 and Table 4.

TABLE 5

|       | $T_2$ | $A_2(P)$ | $I_2$ |
|-------|-------|----------|-------|
| $A_1$ | 0.84  | 0.99     | 0     |
| $T_1$ | 0.96  | 0.84     | 0     |
| $P_1$ | 0.71  | 0.95     | 0.01  |
| $K_1$ | 0.72  | 0.67     | 0.66  |
| $I_1$ | 0     | 0        | 1.00  |

The schema matching system detects a match between attributes when one EVS matrix element is larger than the other elements for the same interface attribute of one web site and also larger than the other elements for the same interface attribute of the other web site. The rectangles of Table 5 depict the largest similarity values in both its row and column, which also shows the correct matching. Although the second attribute of $IS_2$, Author$_2$, is incorrectly matched to Publisher$_2$ of GS, the schema matching system uses inter-site matching to correct the matching.

In one embodiment, the schema matching system cross-validates the global-to-interface correspondence, the global-to-result correspondence, the interface-to-result correspondence, the interface-to-interface correspondence, and the result-to-result correspondence to identify and correct matches that may be incorrect. The schema matching system clusters the interface attributes (and similarly the result attributes) into multiple clusters based on the global attributes to which they match. For example, the attributes of the various web databases that have been matched to a certain global attribute represent one cluster. This clustering is based on the intra-site matching. The inter-site matching can also be used to cross-validate the clusters. If the intra-site and inter-site matching was completely correct, then each attribute of a web database would map to only attributes of other web databases that are within the same cluster. In other words, attributes of the web databases would consistently map to each other and to the global attributes. In one embodiment, the schema matching system represents attributes of the web database schemas as vertices and inter-site matching as edges between the vertices. The schema matching system partitions the vertices such that the edge-cut is minimized. The edge-cut is the sum of weights of all edges (e.g., each edge has the same weight) between partitions. By minimizing the edge-cut, the schema matching system minimizes the number of edges between vertices of different clusters.

In one embodiment, the schema matching system approximates the minimizing of the edge-cut by using the initial clusters as the initial partition and moving vertices from one cluster to another as long as the number of cuts would decrease. In general, a vertex is moved to the cluster in which most of its neighbors reside. Neighbor vertices have an edge between them. Since a vertex needs to be moved if many of its neighbors are moved, the schema matching system may use multiple passes so that the edge-cut converges on a local optimum. When the edge-cut converges, the schema matching system resolves cross cluster matching between attributes $A_i$ of site $S_1$ and $B_j$ of site $S_2$ contained in two clusters $C_1$ and $C_2$ by discarding the cross cluster match and re-matching $A_i$ to attribute $B_k$ of site $S_2$ clustered into $C_1$, or vice versa.

Figure 3:
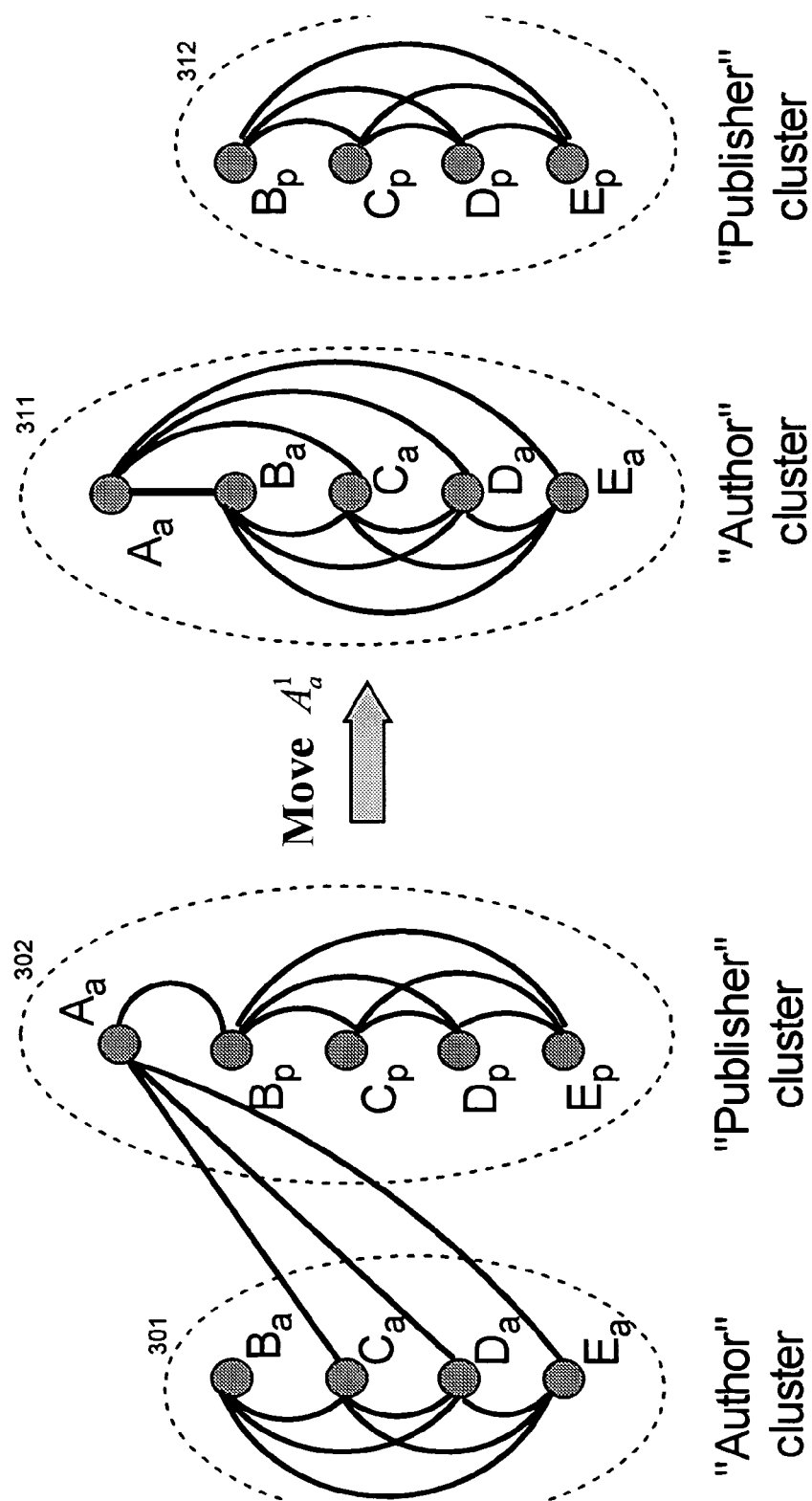
FIG. 3 illustrates one pass of the partitioning of the schema matching system in one embodiment.

FIG. 3 illustrates one pass of the partitioning of the schema matching system in one embodiment. In this example, the global schema contains two attributes {Author, Publisher}, and five web databases contain the IS attributes $IS_1=\{A_a\}$, $IS_2=\{B_a,B_p\}$ $IS_3=\{C_a,C_p\}$, $IS_4=\{D_a, D_p\}$, and $IS_5=\{E_a,E_p\}$. Clusters 301 and 302 illustrate the initial clusters of the attributes (represented by vertices) based on which global attribute they match to (by intra-site matching), and the edges between pairs of attributes indicate that the attributes match (by inter-site matching). In the initial state, $A_a$ is wrongly matched to the Publisher global attribute and also wrongly matched to $B_p$ while it has been correctly matched to three other attributes in the Author category. Therefore, the schema matching system moves $A_a$ to decrease the number of edges across clusters from 3 to 1. The move corrects the matching attribute of $A_a$ from the Publisher to the Author global attribute. After the move, the schema matching system removes the edge between $A_a$ and $B_p$ and adds a new edge between $A_a$ and $B_a$ (the attribute of site 2 that is matched to the Author global attribute). Clusters 311 and 312 represent the corrected correspondences.

Global schemas, interface schemas, and result schemas can be identified using various techniques. Some techniques for identifying global schemas rely on the names of the attributes and the structure of elements. (See S. Castano, V. Antonellis, and S. Vimercati. *Global Viewing of Heterogeneous Data Sources*. IEEE Trans. Data and Knowledge Eng., vol. 13, no. 2, 2001; and B. He, and C. C. Chang. Statistical Schema Matching across Web Query Interfaces. Proc. ACM SIGMOD Conf., 2003, which are hereby incorporated by reference.) Other techniques rely on formal ontologies. (See B. He, and C. C. Chang. Statistical Schema Matching across Web Query Interfaces. Proc. ACM SIGMOD Conf., 2003; and F. Hakimpour, and A. Geppert. Global Schema Generation Using Formal Ontologies. Proc. 21st Conf. on Conceptual Modeling, 2002, which are hereby incorporated by reference.) The sample global attribute values can be collected from various sample web databases or generated manually. The interface schema of a web database can be identified from input-related tags of the query web page as defined by the HTML specification. Some techniques for identifying a result schema generate wrappers to extract embedded semi-structured data content from dynamic template-generated web pages. (See A. Arasu, and H. Garcia-Molina. Extracting Structured Data from Web Pages. Proc. ACM SIGMOD Conf., 2003; C. H. Chang, and S. C. Lui. IEPAD: Information Extraction based on Pattern Discovery. Proc. 10th World Wide Web Conf., 681-688, 2001; V. Crescenzi, G. Mecca and P. Merialdo. ROADRUNNER: Towards Automatic Data Extraction from Large Web Sites. Proc. 27th VLDB. Conf., 109-118, 2001; and J. Wang and F. Lochovsky. Data Extraction and Label Assignment for Web Databases. Proc. 12th World Wide Web Conf., 187-196, 2003, which are hereby incorporated by reference.) One technique generates a regular-expression wrapper based on nested repeated-pattern discovery in HTML pages. (See J. Wang and F. Lochovsky. Data Extraction and Label Assignment for Web Databases. Proc. 12th World Wide Web Conf., 187-196, 2003, which is hereby incorporated by reference.) One skilled in the art would appreciate that each of these schemas could also be identified manually or by a combination of manual and automated means.

Figure 4:
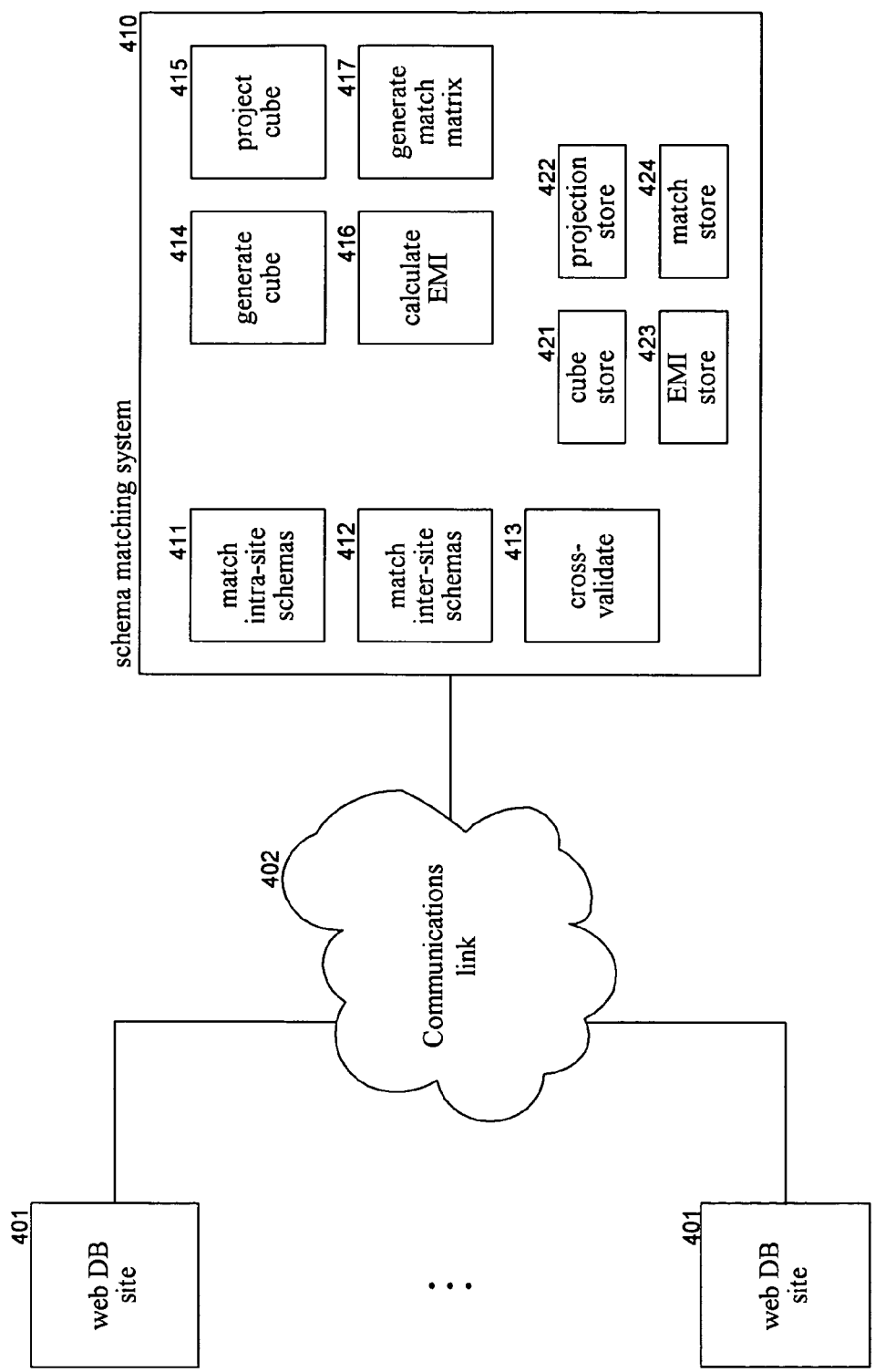
FIG. 4 is a block diagram that illustrates components of the schema matching system in one embodiment.

FIG. 4 is a block diagram that illustrates components of the schema matching system in one embodiment. The schema matching system 410 connects to a various web database site 401 via a communications link 402. The schema matching system includes a match intra-site component 411, a match inter-site component 412, a cross-validate component 413, a generate cube component 414, a project cube component 415, a calculate EMI component 416, and a generate match matrix component 417. The schema matching system also includes a cube store 421, a projection store 422, an EMI store 423, and a match store 424. The match intra-site component invokes the generate cube component to generate an occurrence cube and invokes the project cube component to generate the global-to-interface, global-to-result, and interface-to-result occurrence matrices. The match intra-site component also invokes the calculate EMI component to calculate the estimated mutual information based on occurrence matrices and invokes the generate match matrix to identify which pairs of attributes match. The match inter-site component uses the occurrence matrices to calculate the estimated vector similarity and invokes the generate match matrix to identify matches. The cross-validate component changes the matching for attributes that appear to be incorrectly matched. The cube store contains the occurrence cubes, the projection store contains the occurrence matrices, the EMI store contains the EMI matrices, and the match store contains the match matrices.

The computing device on which the schema matching system is implemented may include a central processing unit, memory, input devices (e.g., keyboard and pointing devices), output devices (e.g., display devices), and storage devices (e.g., disk drives). The memory and storage devices are computer-readable media that may contain instructions that implement the schema matching system. In addition, the data structures and message structures may be stored or transmitted via a data transmission medium, such as a signal on a communications link. Various communications links may be used, such as the Internet, a local area network, a wide area network, or a point-to-point dial-up connection.

The schema matching system may be implemented in various operating environments that include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The schema matching system may be described in the general context of computer-executable instructions, such as program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Figure 5:
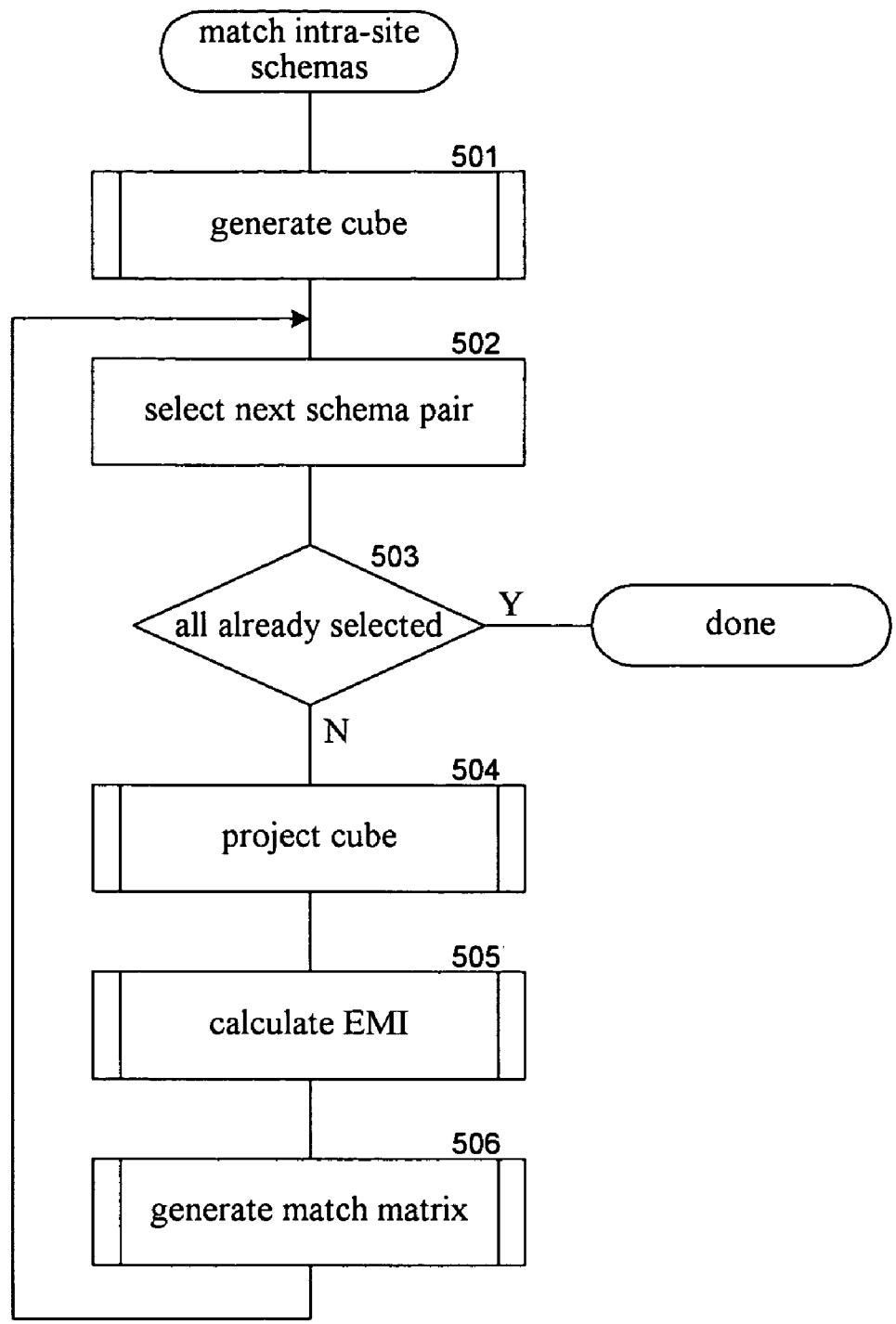
FIG. 5 is a flow diagram that illustrates the processing of the match intra-site component in one embodiment.

FIG. 5 is a flow diagram that illustrates the processing of the match intra-site component in one embodiment. The component identifies the global-to-interface, global-to-result, and interface-to-result correspondences for a web database. In block 501, the component invokes the generate cube component to generate the occurrence cube. In blocks 502-506, the component loops selecting pairs of the schemas (i.e., global and interface, global and result, and interface and result) and generates a match matrix representing the correspondence of each pair. In block 502, the component selects the next pair of schemas. In decision block 503, if all the pairs of schemas have already been selected, the component completes, else the component continues at block 504. In block 504, the component invokes the project cube component to generate the occurrence matrix for the selected pair of schemas. In block 505, the component invokes the calculate EMI component to estimate the mutual information between pairs of attributes of the selected pair of schemas. In block 506, the component invokes the generate match matrix component to generate the match matrix indicating the attribute correspondences for the selected pair of schemas. The component then loops to block 502 to select the next pair of schemas.

Figure 6:
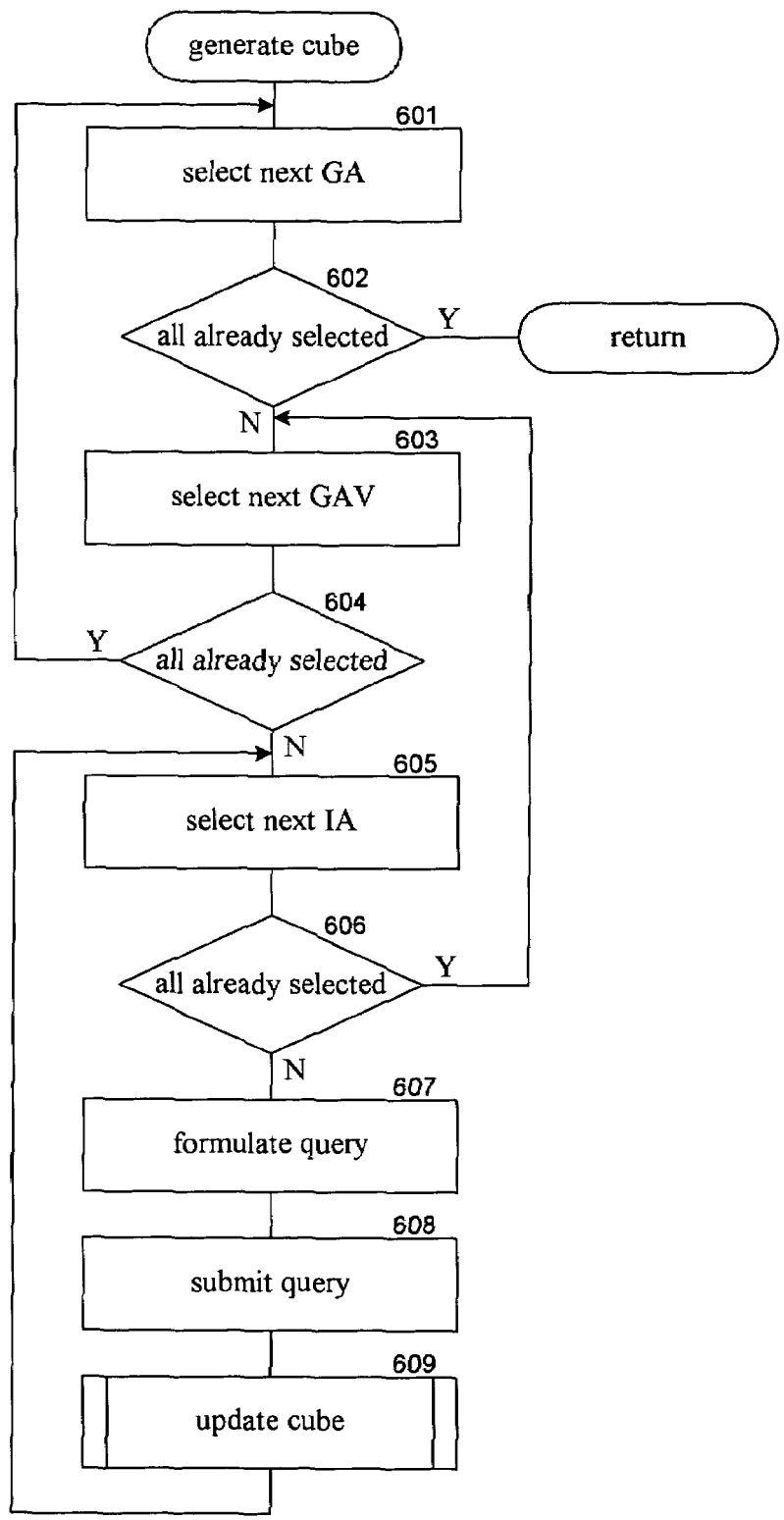
FIG. 6 is a flow diagram that illustrates the processing of the generate cube component in one embodiment.

FIG. 6 is a flow diagram that illustrates the processing of the generate cube component in one embodiment. The component generates an occurrence cure for a web database based on the global schema, interface schema, and result schema. An occurrence cube is a three-dimensional matrix that maps each combination of global attribute, interface attribute, and result attribute to a count. The count is the number of times that a result entry for a query with that interface attribute set to a global attribute value of that global attribute had that global attribute value in that result attribute. In block 601, the component selects the next global attribute. In decision block 602, if all the global attributes have already been selected, then the component returns, else the component continues at block 603. In block 603, the component selects the next global attribute value for the selected global attribute. In decision block 604, if all the global attribute values for the selected global attribute have already been selected, then the component loops to block 601 to select the next global attribute, else the component continues at block 605. In blocks 605-609, the component loops selecting each interface attribute and submitting a query with that interface attribute set to the selected global attribute values. One skilled in the art will appreciate that the domain of values for some interface attributes may be limited. For example, if an interface attribute is represented by an HTML SELECT element, then the domain of its values may be limited to the values in the associated OPTION element. In such a case, the component may only submit queries for global attribute values that are "similar" to an option value. A global attribute value may be considered similar if it contains an option value. One skilled in the art will appreciate that other measures of similarity may be used. The queries for CHECKBOX and RADIOBOX elements can be handled in a similar manner. Since the domain of values for a TEXTBOX may be unknown, the component may exhaustively submit queries using all global attribute values for an interface attribute represented by a TEXT-BOX. In one embodiment, the component sets the value for only one interface attribute for each query. The values of other interface attributes may have a default value as defined by the web site. In block 605, the component selects the next interface attribute. In decision block 606, if all the interface attributes have already been selected, the component loops to block 603 to select the next global attribute value for the selected global attribute. In block 607, the component formulates a query using the selected interface attribute and the selected global attribute value. In block 608, the component submits the formulated query to the web site. In block 609, the component updates the occurrence cube based on the result of the query and then loops to block 605 to select the next interface attribute.

Figure 7:
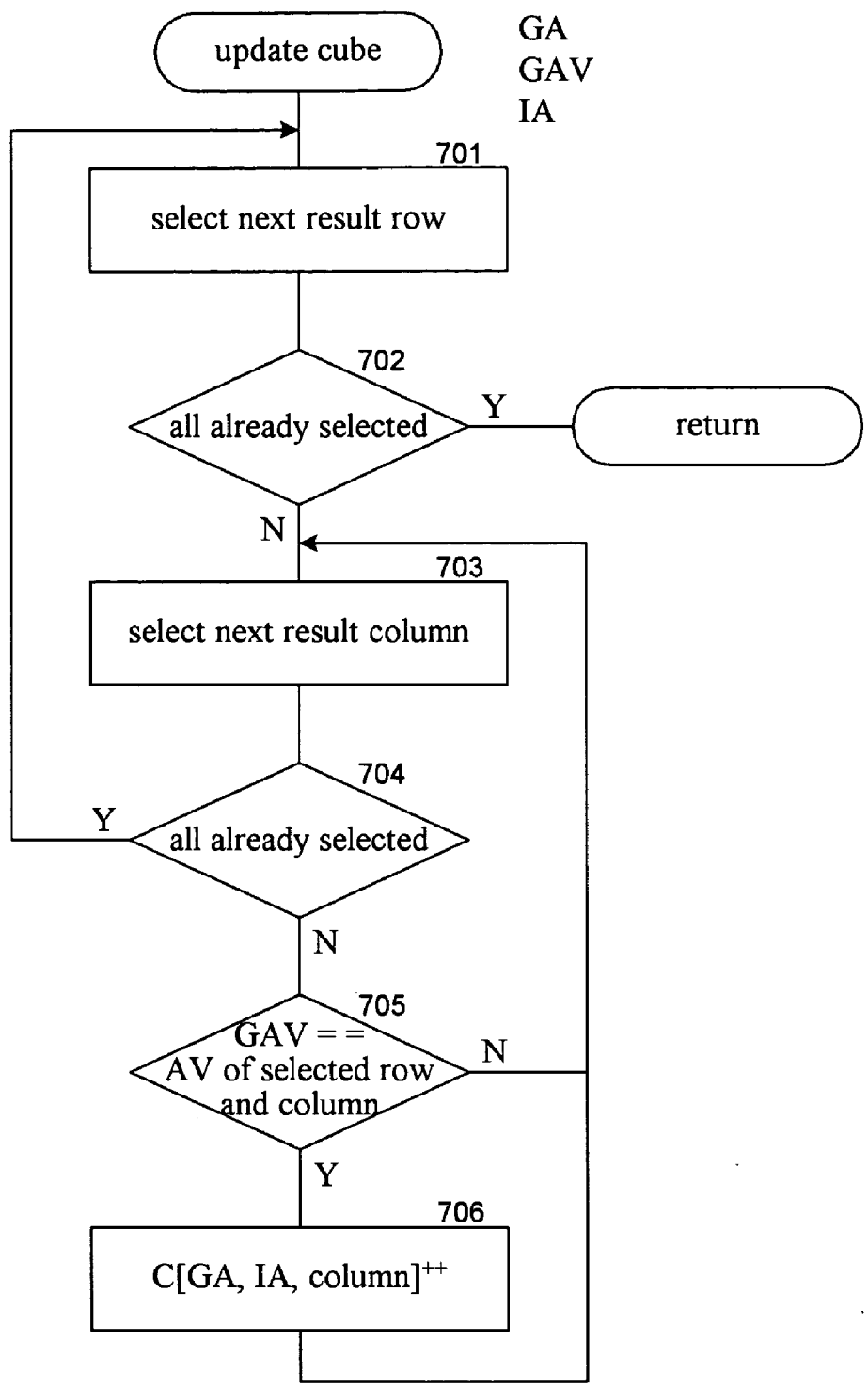
FIG. 7 is a flow diagram that illustrates the processing of the update cube component in one embodiment.

FIG. 7 is a flow diagram that illustrates the processing of the update cube component in one embodiment. The component is passed an indication of a global attribute, a global attribute value, and an interface attribute and a query result. In block 701, the component selects the next entry or row of the result. In decision block 702, if all the entries of the result have already been selected, then the component returns, else the component continues at block 703. In block 703, the component selects the next result attribute or column. In decision block 704, if all the result attributes have already been selected, then the component loops to block 701 to select the next entry of the result, else the component continues at block 705. In block 705, if the global attribute value is equal to the value of the selected result attribute of the selected entry, then the component continues at block 706, else the component loops to block 703 to select the next result attribute of the selected entry. In block 706, the component increments the count within the occurrence cube for the passed global attribute, passed interface attribute, and selected result attribute. The component then loops to block 703 to select the next result attribute of the selected entry.

Figure 8:
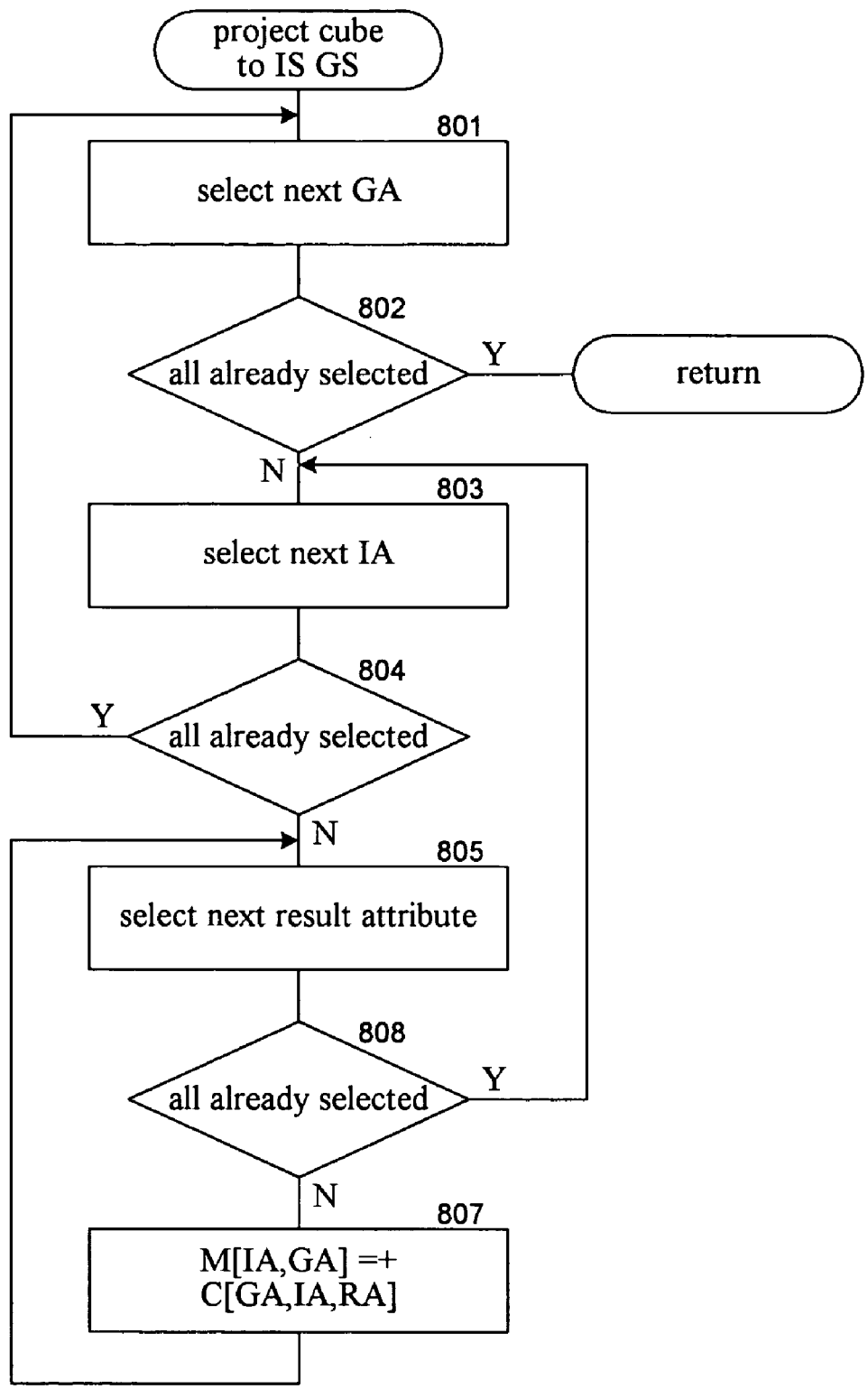
FIG. 8 is a flow diagram that illustrates the processing of the project cube component in one embodiment.

FIG. 8 is a flow diagram that illustrates the processing of the project cube component in one embodiment. In this embodiment, the component generates the occurrence matrix for the global-to-interface correspondence. The schema matching system may generate occurrence matrices for the global-to-result correspondence and the interface-to-result correspondence in a similar manner. In this embodiment, the component sums the counts of the result attributes for a global attribute and interface attribute pair to project the three dimensions of the occurrence cube into the two dimensions of the correspondence matrix. One skilled in the art will appreciate that projections techniques other than a straightforward summation can be used. For example, the component may use a weighted summation where the weight is based on a confidence derived during the automatic identification of the result schema. In block 801, the component selects the next global attribute. In decision block 802, if all the global attributes have already been selected, then the component returns, else the component continues at block 803. In block 803, the component selects the next interface attribute. In decision block 804, if all the interface attributes have already been selected, then the component loops to block 801 to select the next global attribute, else the component continues at block 805. In block 805, the component selects the next result attribute. In decision block 806, if all the result attributes have already been selected, then the component loops to block 803 to select the next interface attribute, else the component continues at block 807. In block 807, the component increments the count in the occurrence matrix for the selected interface attribute and global attribute by the count from the occurrence cube for the selected global attribute, interface attribute, and result attribute. The component then loops to block 805 to select the next result attribute.

Figure 9:
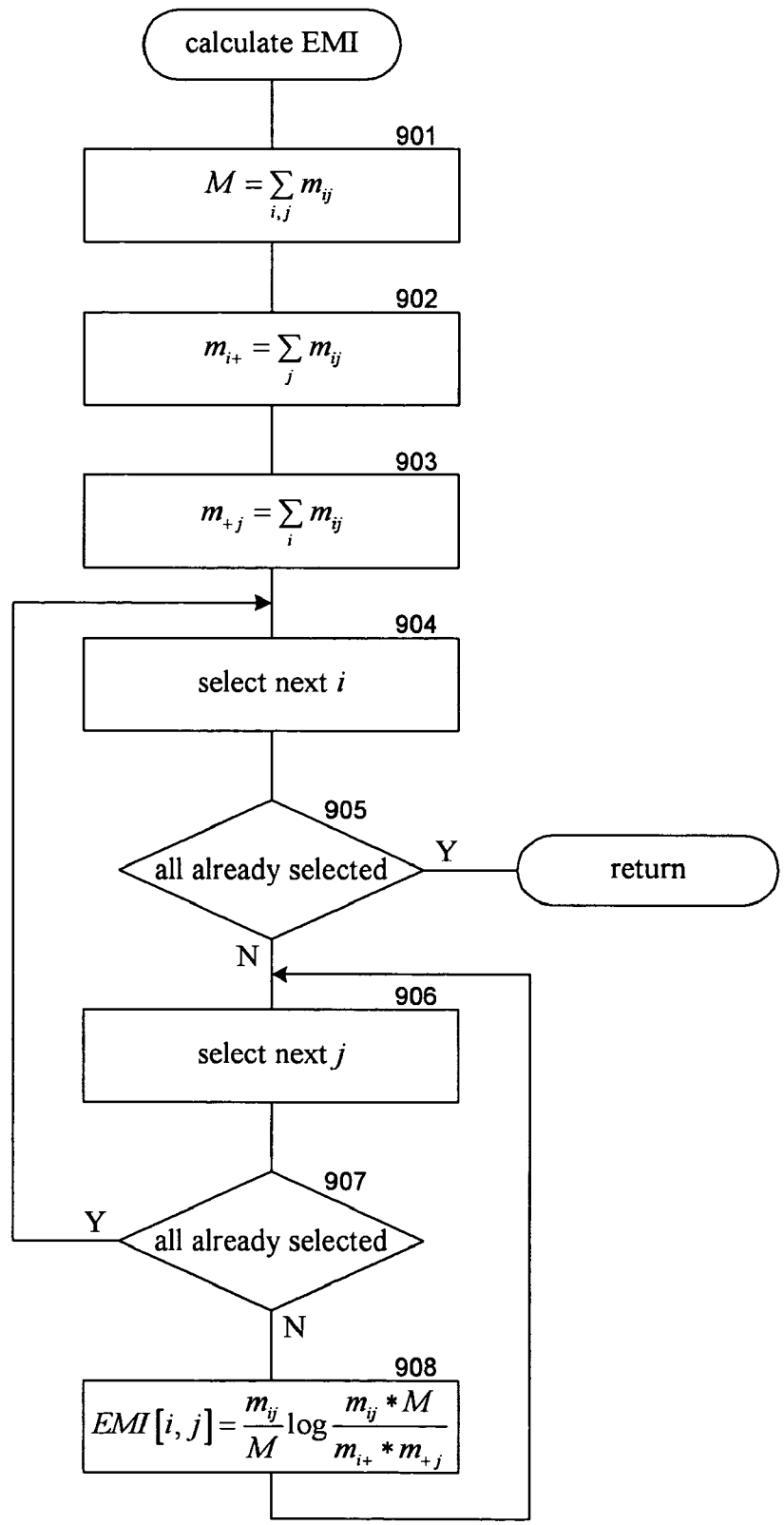
FIG. 9 is a flow diagram that illustrates the processing of the calculate EMI component in one embodiment.

FIG. 9 is a flow diagram that illustrates the processing of the calculate EMI component in one embodiment. This component uses the Equation 1 to estimate the mutual information for pairs of attributes in an occurrence matrix. One skilled in the art will appreciate that various techniques may be used to estimate a likelihood that pairs of attributes match. The component is passed an occurrence matrix and returns an EMI matrix. In block 901, the component calculates the sum of all counts within the occurrence matrix. In block 902, the component calculates the sum of the counts within each row of the occurrence matrix. In block 903, the component calculates the sum of the counts within each column of the occurrence matrix. In blocks 904-908, the component loops selecting each pair of attributes of the occurrence matrix and determines a likelihood that the attributes match. In block 904, the component selects the next row of the occurrence matrix. In decision block 905, if all the rows of the occurrence matrix have already been selected, the component returns, else the component continues at block 906. In block 906, the component selects the next column of the occurrence matrix. In decision block 907, if all the columns of the occurrence matrix have already been selected, then the component loops to block 904 to select the next row of the occurrence matrix, else the component continues at block 908. In block 908, the component calculates the estimated mutual information for the attributes represented by the selected row and column. The component then loops to block 906 to select the next column.

Figure 10:
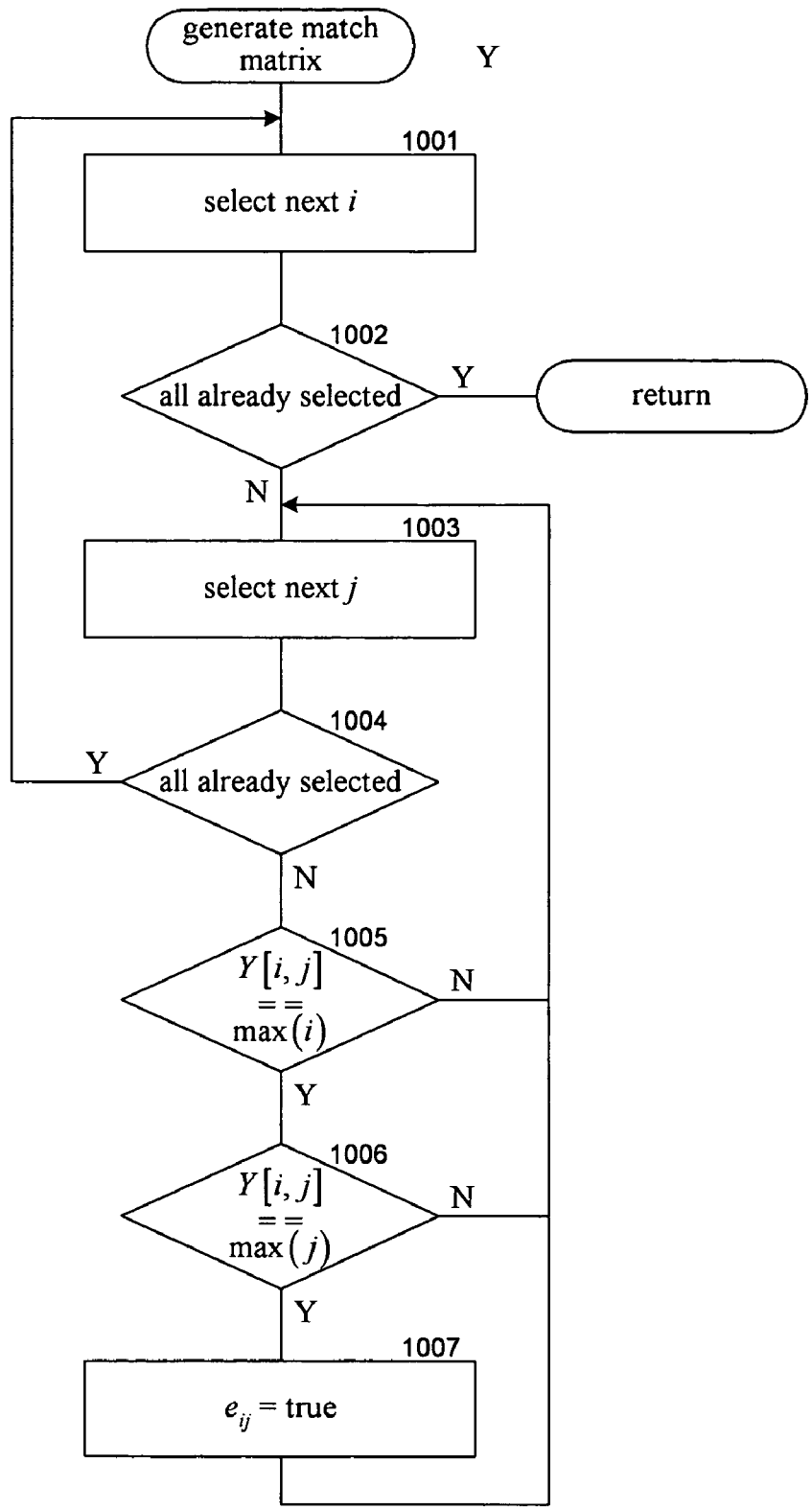
FIG. 10 is a flow diagram that illustrates the processing of the generate match matrix component in one embodiment.

FIG. 10 is a flow diagram that illustrates the processing of the generate match matrix component in one embodiment. The component is passed a matrix, such as an EMI matrix, that indicates the likelihood that pairs of attributes match. If a likelihood for a pair of attributes is the highest likelihood for both attributes (e.g., the highest in the row representing one attribute and the highest in the column representing the other attribute), the component finds that the attributes match. In block 1001, the component selects the next row of the passed matrix. In decision block 1002, if all the rows of the passed matrix have already been selected, then the component returns, else component continues at block 1003. In block 1003, the component selects the next column of the passed matrix. In decision block 1004, if all the columns of the passed matrix have already been selected, then the component loops to block 1001 to select the next row of the passed matrix, else the component continues at block 1005. In decision block 1005, if the value of the selected row and column is the highest within that row, then the component continues at block 1006, else the component loops to block 1003 to select the next column. In decision block 1006, if the value of the selected row and column is the highest within that column, then the component continues at block 1007, else the component loops to block 1003 to select the next column. In block 1007, the component sets the value of the match matrix for the selected row and column to indicate a match and then loops to block 1003 to select the next column of the selected row.

Figure 11:
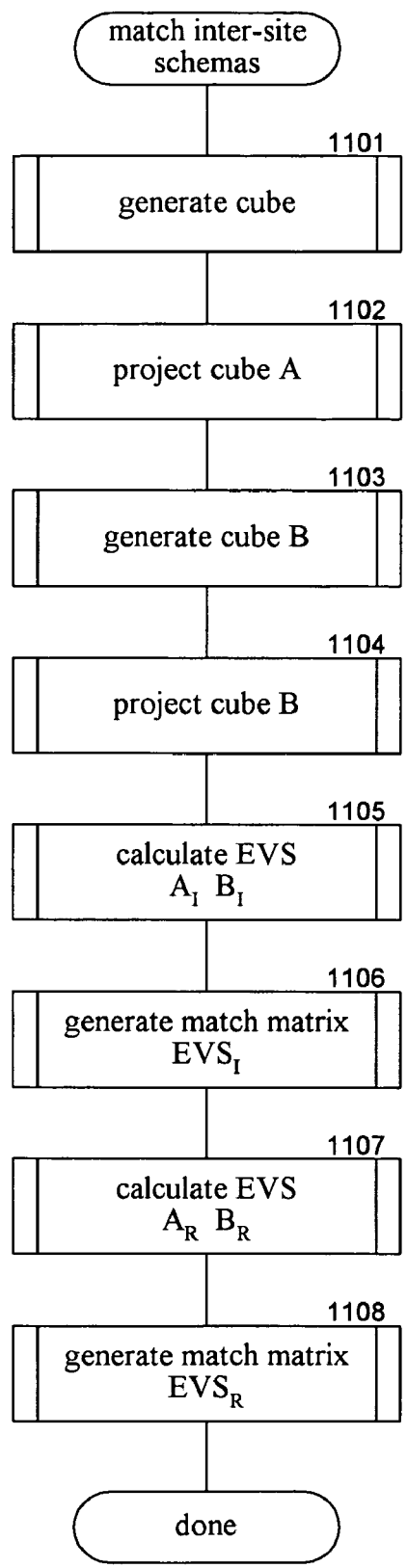
FIG. 11 is a flow diagram that illustrates the processing of the match inter-site component in one embodiment.

FIG. 11 is a flow diagram that illustrates the processing of the match inter-site component in one embodiment. The component identifies which attributes (interface and result) of one web site match which attributes of another web site.

The component uses the occurrence matrix of the global-to-interface correspondence of the web sites to identify the matches for the interface schemas and the occurrence matrix of the global-to-result correspondence of the web sites to identify the matches for the result schemas. In block 1101, the component invokes the generate cube component to generate the occurrence cube for site A. In block 1102, the component invokes the project cube component to generate the occurrence matrices for site A. In block 1103, the component invokes the generate cube component to generate the occurrence cube for site B. In block 1104, the component invokes the project cube component to generate the occurrence matrices for site B. In block 1105, the component invokes a calculate estimated vector similarity component for the interface attributes to generate a likelihood that pairs of interface attributes from site A and site B match. One skilled in the art will appreciate that many different techniques may be used to estimate this likelihood and that vector similarity is just one example. In block 1106, the component invokes the generate match matrix component passing the estimated vector similarity matrix for the interface attributes to generate a matrix indicating which pairs of interface attributes match. In block 1107, the component invokes a calculate estimated vector similarity component to generate the estimated vector similarity matrix for the result attributes. In block 1108, the component invokes a generate match matrix component to generate a matrix indicating which pairs of result attributes match. The component then completes.

Figure 12:
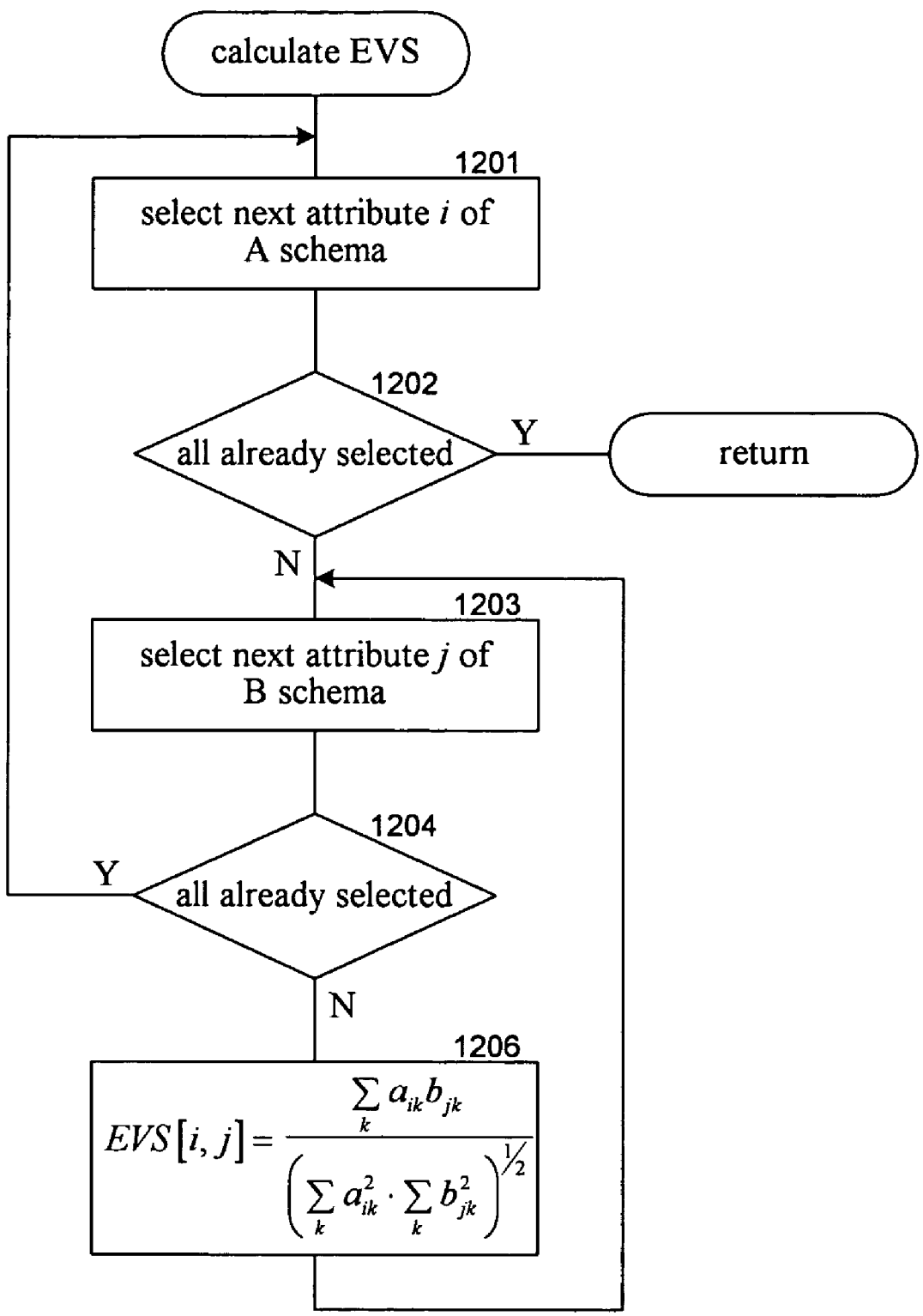
FIG. 12 is a flow diagram that illustrates the processing of the calculate estimated vector similarity component in one embodiment.

FIG. 12 is a flow diagram that illustrates the processing of the calculate estimated vector similarity component in one embodiment. The component is passed an occurrence matrix for an interface-to-interface correspondence or a result-to-result correspondence and determines the likelihood that each pair of attributes matches. In block 1201, the component selects the next attribute of site A. In decision block 1202, if all the attributes of site A have already been selected, then the component returns, else the component continues at block 1203. In block 1203, the component selects the next attribute of site B. In decision block 1204, if all the attributes of site B have already been selected, then the component loops to block 1201 to select the next attribute of site A, else the component continues at block 1205. In block 1205, the component calculates the estimated vector similarity for the selected attributes according to Equation 3 and then loops to block 1203 to select the next attribute of site B.

Figure 13:
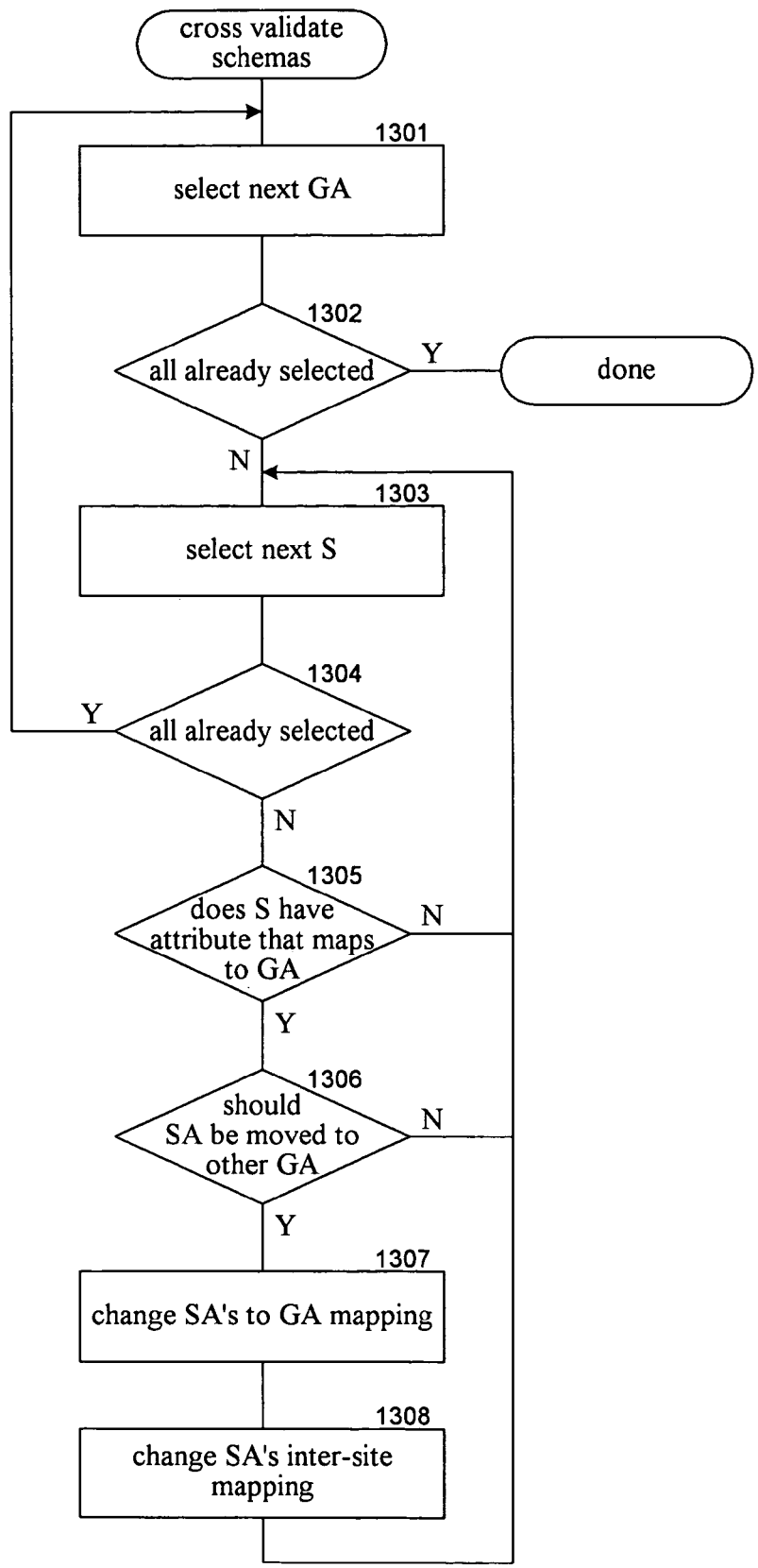
FIG. 13 is a flow diagram that illustrates the processing of the cross-validate component in one embodiment.

FIG. 13 is a flow diagram that illustrates the processing of the cross-validate component in one embodiment. When the inter-site matches indicate that an intra-site match is incorrect, the component changes the matches of the attributes. In block 1301, the component selects the next global attribute. In decision block 1302, if all the global attributes have already been selected, then the component completes, else the component continues at block 1303. In block 1303, the component selects the next web site. In decision block 1304, if all the web sites have already been selected, then the component loops to block 1301 to select the next global attribute, else the component continues at block 1305. In decision block 1305, if the selected web site has an attribute that matches the selected global attribute, then the component continues at block 1306, else the component loops to block 1303 to select the next web site. In decision block 1306, if the selected attribute should be moved to another global attribute, then the component continues at block 1307, else the component loops to block 1303 to select the next web site. In block 1307, the component changes the selected attribute to match to a different global attribute. In block 1308, the component changes the selected attribute's intra-site matches. The component then loops to block 1303 to select the next web site.

One skilled in the art will appreciate that although specific embodiments of the schema matching system have been described herein for purposes of illustration, various modifications may be made without deviating from the spirit and scope of the invention. Accordingly, the invention is not limited except by the appended claims.

We claim:

1. A method in a computer system for generating an occurrence cube, the method comprising:
for each global attribute of a domain of a database,
for each interface attribute of the database,
submitting queries to the database, each query having a value of the interface attribute of the database set to a global attribute value of the global attribute of the domain of the database; and
for each result of each submitted query, counting the number of times the value of the global attribute occurs within each result attribute of the result; and
for each global attribute, interface attribute, and result attribute combination, storing as an element of the occurrence cube an accumulation of the counts of the number of times the value of the global attribute occurs within each result attribute in a result from a query submitted with the interface attribute set to a global attribute value of the global attribute,
wherein the stored elements form the occurrence cube.

2. The method of claim 1 including generating an occurrence matrix associated with global attributes and interface attributes from the occurrence cube.

3. The method of claim 1 including generating an occurrence matrix associated with global attributes and result attributes from the occurrence cube.

4. The method of claim 1 including generating an occurrence matrix associated with interface attributes and result attributes from the occurrence cube.

5. The method of claim 1 wherein a query is submitted for each combination of global attribute value and interface attribute.

6. The method of claim 1 wherein the occurrence cube includes a count for each global attribute, interface attribute, and result attribute combination.

7. A method in a computer system for identifying attributes of a database within a domain, the method comprising:
providing counts of occurrences associated with global attributes of a global schema of the domain and interface attributes of an interface schema and result attributes of a result schema of the database, each count representing, for each global attribute, interface attribute, and result attribute combination, the number of occurrences in which a global attribute value for the global attribute occurs as a value of the result attribute in a result of a guery submitted to the database with the interface attribute set to the global attribute value;
estimating mutual information between pairs of schemas based on the provided counts;
identifying from the estimated mutual information which attributes match; and
storing an indication of the matching attributes.

8. The method of claim 7 wherein the providing of the counts includes projecting an occurrence cube that provides a count of occurrences associated with global attributes, interface attributes, and result attributes into a matrix associated with pairs of schemas.

9. The method of claim 8 including generating the occurrence cube by submitting queries to the database with values of the interface attributes set to global attribute values of the global attributes.

10. The method of claim 9 wherein the count of occurrences within the occurrence cube represents the number of times that global attribute values of a global attribute is used as a value of an interface attribute in a query are in a result attribute of the result of the query.

11. The method of claim 7 wherein the interface attributes are identified based on HTML input-related elements.

12. The method of claim 7 wherein the result attributes are identified using a regular expression wrapper.

13. The method of claim 7 wherein the counts of occurrences are provided by submitting queries to the database with values of interface attributes set to global attribute values of the global attributes.

14. The method of claim 7 wherein the mutual information is estimated by the following:

$$EMI(S_{1i}, S_{2j}) = \frac{m_{ij}}{M} \log \frac{\frac{m_{ij}}{M}}{\frac{m_{i+}}{M} * \frac{m_{+j}}{M}}.$$

15. The method of claim 7 wherein a match between attributes in a pair of schemas is identified when an attribute of one schema with the highest estimated mutual information for an attribute of the other schema has no higher estimated mutual information for another attribute of the other schema.

* * * * *